(12) United States Patent
Zhao et al.

(10) Patent No.: US 10,880,561 B2
(45) Date of Patent: Dec. 29, 2020

(54) IMAGE PROCESSING METHOD AND IMAGE PROCESSING DEVICE

(71) Applicant: Shanghai Zhaoxin Semiconductor Co., Ltd., Shanghai (CN)

(72) Inventors: Yongtao Zhao, Shanghai (CN); Ruiyang Chen, Shanghai (CN); Yuanfeng Wang, Shanghai (CN); Wei Wang, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 86 days.

(21) Appl. No.: 16/432,900

(22) Filed: Jun. 5, 2019

(65) Prior Publication Data
US 2020/0366915 A1    Nov. 19, 2020

(30) Foreign Application Priority Data

May 13, 2019    (CN) .......................... 2019 1 0393864

(51) Int. Cl.
*H04N 19/423*    (2014.01)
*G06F 3/06*    (2006.01)
*G06T 9/00*    (2006.01)

(52) U.S. Cl.
CPC ......... *H04N 19/423* (2014.11); *G06F 3/0604* (2013.01); *G06F 3/064* (2013.01); *G06F 3/0631* (2013.01); *G06F 3/0659* (2013.01); *G06F 3/0661* (2013.01); *G06F 3/0673* (2013.01); *G06T 9/00* (2013.01)

(58) Field of Classification Search
CPC ....... H04N 19/423; G06T 9/00; G06F 3/0673; G06F 3/064; G06F 3/0604; G06F 3/0661; G06F 3/0631; G06F 3/0659
See application file for complete search history.

(56) References Cited

U.S. PATENT DOCUMENTS

| | | | |
|---|---|---|---|
| 7,190,284 B1 * | 3/2007 | Dye ........................ | H03M 7/30 341/51 |
| 2003/0163328 A1 * | 8/2003 | Rambo ..................... | G06F 3/16 704/500 |
| 2016/0117257 A1 * | 4/2016 | Solihin ............... | G06F 12/0646 711/209 |

* cited by examiner

*Primary Examiner* — Casey L Kretzer
(74) *Attorney, Agent, or Firm* — JCIPRNET (57) ABSTRACT

An image processing method and an image processing device are provided. The method includes: retrieving a first and second blocks and compressing the first and second blocks into a first and second streams; in response to determining performing a dynamic memory allocation mechanism to the first and second blocks, respectively allocating a first and second private storage spaces to the first and second blocks, and allocating a shared storage space shared by the first and second blocks and divided into multiple segments; when the first private storage space is insufficient to store the first stream, using the first private storage space and a first part of the segments to cooperatively store the first stream; when the second private storage space is insufficient to store the second stream, using the second private storage space and a second part of the segments to cooperatively store the second stream.

24 Claims, 5 Drawing Sheets

IMAGE PROCESSING METHOD AND IMAGE PROCESSING DEVICE

CROSS-REFERENCE TO RELATED APPLICATION

This application claims the priority benefit of China application serial no. 201910393864.7, filed on May 13, 2019. The entirety of the above-mentioned patent application is hereby incorporated by reference herein and made a part of this specification.

BACKGROUND

Technical Field

The disclosure relates to an image processing method and an image processing device, and particularly relates to an image processing method and an image processing device adopting a dynamic memory allocation mechanism.

Description of Related Art

In a field of image processing, a compression result of a compression algorithm is mainly affected by pixel information in an image. When the same compression algorithm is adopted to compress two images with the same size, compression results of different lengths may be obtained due to the different pixel information. In today's image processing field, it is often required to compress an image according to a compression ratio of 2:1 or 3:1. Namely, one image must be able to be stored in a compressed space with a size equal to ½ or ⅓ of an original size after compression.

Moreover, in a situation where partial compression and partial decompression are required, besides that the compression ratio must be ensured, the image needs to be compressed at a finer granularity. To be specific, it is assumed that a size of an image is 100×80 (i.e., there are 8000 pixels totally), and it is required to compress the image at a minimum granularity of 16 pixels (referred to as a "block"), the image is divided into 500 blocks. Moreover, theses blocks are respectively compressed into independent streams. Then, the 500 streams are stored in a compressed space.

If it is required to compress the image according to the compression ratio of 2:1, the compressed 500 streams must be placed in a compressed space with a size equal to ½ of the original image. Under the above assumption, the size of the compressed space is 96000 bits, i.e., (½×100×80×24), where the number 24 is a sum of bit numbers used for representing red (R), green (G), blue (B) of a single pixel (where R, G, B respectively correspond to one byte).

In the conventional method, the aforementioned compressed space of 96000 bits is firstly divided into 500 equal parts (where each equal part contains 192 bits), and each equal part is used for storing a stream generated by compressing one block. However, as described above, a length of the stream generated by compressing each block may be different due to different pixel information within the block.

Moreover, in the compression algorithm of the block, since it is required to support random access, a stream budget thereof needs to be limited to a fixed size, which is generally determined by the compression ratio. In order to achieve a same coding quality, a bit number of a coded stream is smaller for a block with simpler content, and the bit number of the coded stream is larger for a block with more complex content. According to the above example, taking a block with a size of 8×2 as an example, in case that the compression ratio is 2, the stream budget thereof is 192 bits (i.e., (8×2×3×8)/2). In order to support the random access, an encoder needs to ensure that each block does not exceed the budget. Regarding the blocks with more complex content, the above size limitation will lead to the use of a more intensive compression means, and the image quality may also be greatly reduced.

SUMMARY

The disclosure is directed to an image processing method and an image processing device, which are adapted to resolve the aforementioned technical problem.

The disclosure provides an image processing method including: retrieving a first block and a second block belonging to a first specific block group from a first image frame, and respectively compressing the first block and the second block into a first stream and a second stream; determining whether to adopt a dynamic memory allocation mechanism to the first block and the second block; in response to determining to adopt the dynamic memory allocation mechanism to the first block and the second block, allocating a first private storage space to the first block and allocating a second private storage space to the second block, and allocating a shared storage space shared by the first block and the second block, wherein the shared storage space is divided into a plurality of first segments; when the first private storage space is insufficient to store the first stream, using the first private storage space and a first part of the first segments to cooperatively store the first stream, wherein the first part of the first segments is located at a first end of the shared storage space; when the second private storage space is insufficient to store the second stream, using the second private storage space and a second part of the first segments to cooperatively store the second stream, wherein the second part of the first segments is located at a second end of the shared storage space.

The disclosure provides an image processing device including a storage circuit and a processor. The storage circuit stores a plurality of modules. The processor is coupled to the storage circuit, and accesses the modules to execute following steps: retrieving a first block and a second block belonging to a first specific block group from a first image frame, and respectively compressing the first block and the second block into a first stream and a second stream; determining whether to adopt a dynamic memory allocation mechanism to the first block and the second block; in response to determining to adopt the dynamic memory allocation mechanism to the first block and the second block, allocating a first private storage space to the first block, allocating a second private storage space to the second block, and allocating a shared storage space shared by the first block and the second block, wherein the shared storage space is divided into a plurality of first segments; when the first private storage space is insufficient to store the first stream, using the first private storage space and a first part of the first segments to cooperatively store the first stream, wherein the first part of the first segments is located at a first end of the shared storage space; and when the second private storage space is insufficient to store the second stream, using the second private storage space and a second part of the first segments to cooperatively store the second stream, wherein the second part of the first segments is located at a second end of the shared storage space.

Based on the above description, the image processing device of the disclosure may adaptively divide the shared storage space and perform corresponding dynamic allocation and updating, so that corresponding coding budgets are allocated according to the content complexities of the first block and the second block. Moreover, the disclosure also supports the re-adjustment of the coding budget, thereby improving flexibility of an encoder while ensuring the coding quality.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
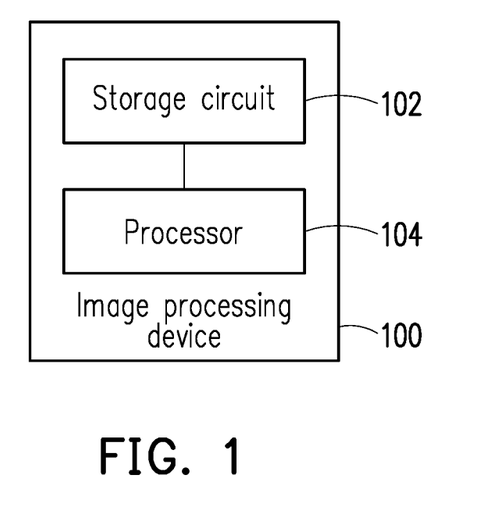
FIG. 1 illustrates an image processing device according to an embodiment of the disclosure.

Referring to FIG. 1, FIG. 1 illustrates an image processing device according to an embodiment of the disclosure. In FIG. 1, the image processing device 100 may be a mobile phone, a smart phone, a Personal Computer (PC), a notebook PC, a netbook PC, a tablet PC, a television, a game console, a portable device or a portable multimedia player, etc., which is not limited by the disclosure.

Referring to FIG. 1, the image processing device 100 includes a storage circuit 102 and a processor 104. The storage circuit 102 is, for example, any type of a fixed or movable Random Access Memory (RAM), a Read-Only Memory (ROM), a flash memory, a hard disk or other similar device or a combination of the above devices, which is configured to record a plurality of program codes or modules.

The processor 104 is coupled to the storage circuit 102, and may be a general purpose processor, a special purpose processor, a conventional processor, a digital signal processor, a plurality of microprocessors, one or a plurality of microprocessors combined with a digital signal processor core, a controller, a microcontroller, an Application Specific Integrated Circuit (ASIC), a Field Programmable Gate Array (FPGA), any other types of integrated circuit, a state machine, a processor based on an Advanced RISC Machine (ARM), and similar product.

In the embodiment of the disclosure, the processor 104 may load the program codes or modules recorded in the storage circuit 102 to execute an image processing method provided by the disclosure, which is described in detail below.

Figure 2:
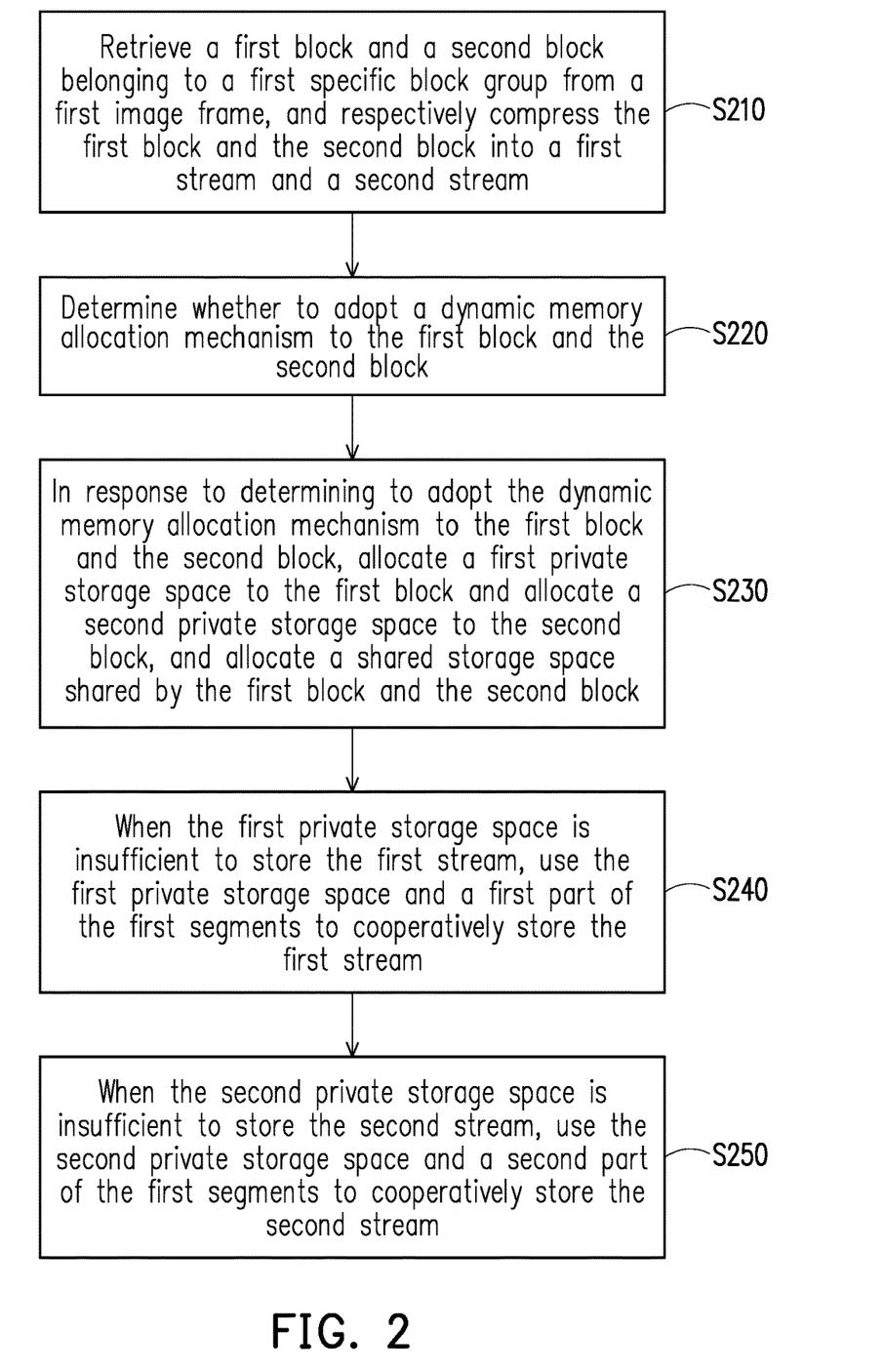
FIG. 2 is a flowchart illustrating an image processing method according to an embodiment of the disclosure.
Figure 3:
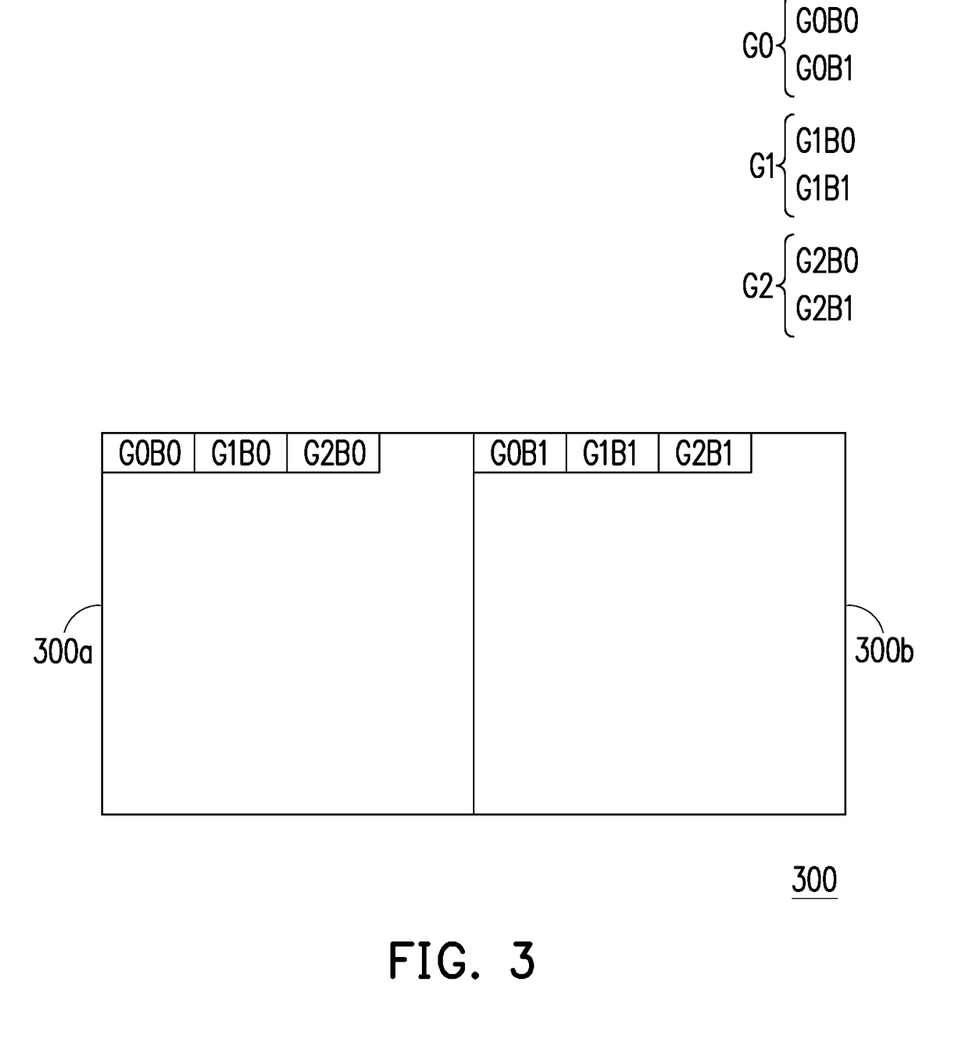
FIG. 3 is a schematic diagram of an image frame according to an embodiment of the disclosure.
Figure 4:
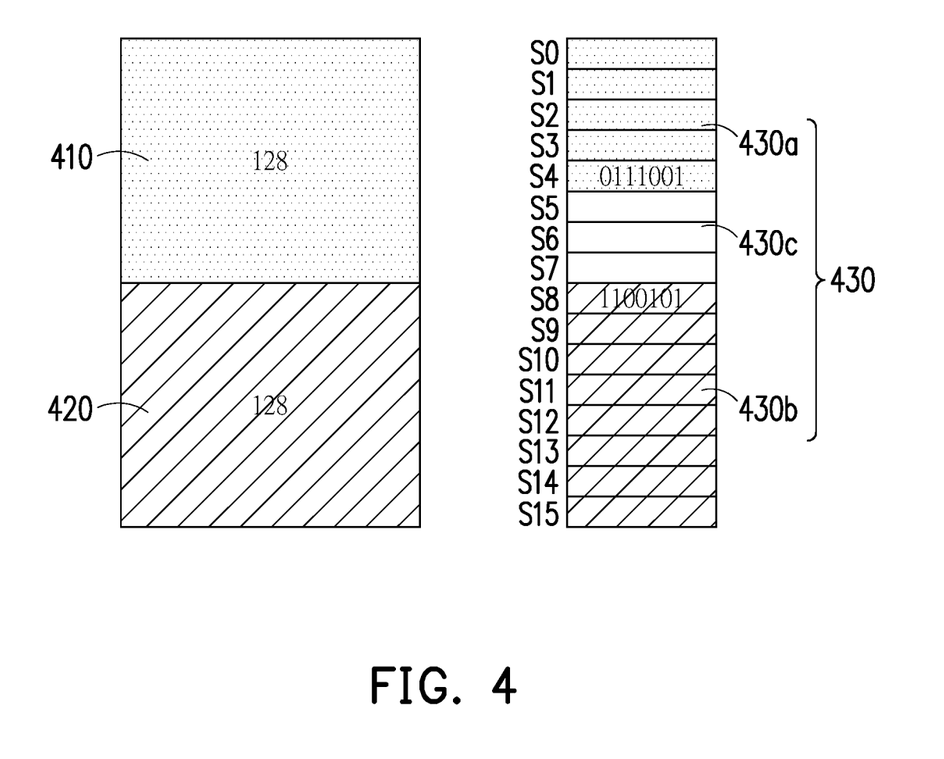
FIG. 4 is a schematic diagram of a dynamic memory allocation mechanism according to an embodiment of the disclosure.
Figure 5:
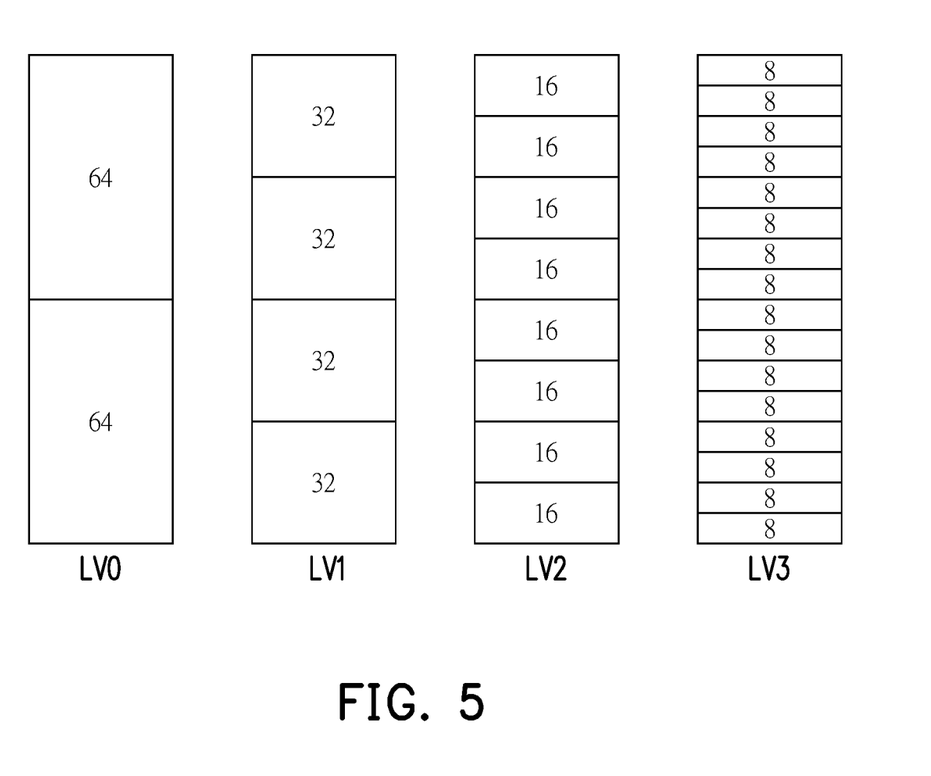
FIG. 5 is a schematic diagram of dividing a shared storage space into a plurality of segments according to different embodiments of the disclosure.

Referring to FIG. 2, FIG. 2 is a flowchart illustrating an image processing method according to an embodiment of the disclosure. The method of the embodiment may be executed by the image processing device 100 of FIG. 1, and details of various steps of the method are introduced below with reference of various components shown in FIG. 1. Moreover, in order to make the various steps in FIG. 2 easier to understand, FIG. 3, FIG. 4 and FIG. 5 are provided for assistance, where FIG. 3 is a schematic diagram of an image frame according to an embodiment of the disclosure, FIG. 4 is a schematic diagram of a dynamic memory allocation mechanism according to an embodiment of the disclosure, and FIG. 5 is a schematic diagram of dividing a shared storage space into a plurality of segments according to different embodiments of the disclosure. It should be noted that the content of FIG. 3 to FIG. 5 is only an example, and is not used for limiting possible implementations of the disclosure.

First, in step S210, the processor 104 retrieves a first block and a second block belonging to a first specific block group from a first image frame 300, and respectively compresses the first block and the second block into a first stream and a second stream.

In the embodiment, the first image frame 300 is, for example, one frame in a video clip, but the disclosure is not limited thereto. In an embodiment, the processor 104 may divide the first image frame 300 into a plurality of blocks (for example, blocks G0B0, G1B0, G2B0, G0B1, G1B1 and G2B1 shown in FIG. 3, but the disclosure is not limited thereto) according to a predetermined block size after obtaining the first image frame 300. Thereafter, the processor 104 may define any two blocks in the blocks of the first image frame 300 as a specific block group.

In an embodiment, the blocks grouped into the same specific block group may be spatially irrelevant with each other. Taking FIG. 3 as an example, the processor 104 may first divide the first image frame 300 into a first sub-frame 300a and a second sub-frame 300b symmetrical to each other. Thereafter, the processor 104 may retrieve two blocks with positions corresponding to each other from the first sub-frame 300a and the second sub-frame 300b, and groups the two blocks to the same specific block group. For example, the processor 104 may group the block G0B0 in the first sub-frame 300a and the block G0B1 in the second sub-frame 300b to a first specific block group G0, where the blocks G0B0 and G0B1 are included. Similarly, the processor 104 may also group the block G1B0 and the block G1B1 to a first specific block group G1, and group the block G2B0 and the block G2B1 to a first specific block group G2.

For simplicity's sake, the first specific block group G0 is taken as an example for description, and those skilled in the art may deduce operations of the processor 104 on other specific block groups (for example, the first specific block groups G1 and G2) in the first image frame 300 according to following instructions.

In a step S210, the processor 104 retrieves a block G0B0 (which is referred to as a first block hereinafter) and a block G0B1 (which is referred to as a second block hereinafter) belonging to the first specific block group G0 from the first image frame 300, and respectively compresses the blocks G0B0 and G0B1 into the first stream and the second stream.

Thereafter, in a step S220, the processor 104 determines whether to adopt a dynamic memory allocation mechanism to the first block and the second block. In an embodiment, the processor 104 may determine whether a sum of a length of the first stream and a shared space information of the first specific block group G0 is smaller than a coding budget of the first block by a predetermine length. If yes, the processor 104 determines to adopt the dynamic memory allocation mechanism of the disclosure to the first block and the second block, and sets a flag bit of the first specific block group G0 to a first state (for example, 1); if not, the processor 104 sets the flag bit of the first specific block group G0 to a second state (for example, 0) to represent not to adopt the dynamic memory allocation mechanism to the first block and the second block. In the embodiment of the disclosure, the shared space information may include a spatial division granularity information and a segment usage amount, and definitions of the above two parameters are to be described later.

In an embodiment, if the first image frame 300 in a full update coding stage, the coding budget of the first block is a half of a coding budget of the first specific block group G0 minus one, and the aforementioned predetermined length is one byte.

In an embodiment, when the first image frame 300 in the full update coding stage, it represents that there may be no other similar image frame is available for image compression before the first image frame 300. Comparatively, when the first image frame 300 is in a partial update coding stage, it represents that that there may be another similar image (for example, a previous image frame of the first image frame 300) before the first image frame 300, so that the image compression operation of the first image frame 300 may be implemented by performing partial updating to the another image frame, but the disclosure is not limited thereto.

In an embodiment, it is assumed that a size of the first block is 8×2, in case that the compression ratio is 2, the coding budget of the block G0B0 is 191 bits (i.e., 384/2-1). Under such consumption, if the sum of the length of the first stream and the shared space information of the first specific block group G0 is smaller than 191 bits by one byte, the processor 104 determines that it is required to adopt the dynamic memory allocation mechanism of the disclosure to the first block and the second block, and vice versa. In other embodiments, those skilled in the art may also adjust the parameter used for determining whether to adopt the dynamic memory allocation mechanism according to an actual requirement, which is not limited to the above disclosed content.

Then, in a step S230, in response to determining to adopt the dynamic memory allocation mechanism to the first block and the second block, the processor 104 may allocate a first private storage space 410 to the first block, allocate a second private storage space 420 to the second block, and allocate a shared storage space 430 shared by the first block and the second block, as shown in FIG. 4.

In FIG. 4, the first private storage space 410 and the second private storage space 420 may be respectively used for storing the first stream and the second stream, and a size of each of the first private storage space 410 and the second private storage space 420 may be 128 bits. Correspondingly, a size of the shared storage space may be 128 bits (i.e., 384-128×2), but the disclosure is not limited thereto.

Generally, when the processor 104 adopts the dynamic memory allocation mechanism of the disclosure, the processor 104 may first store the first stream to the first private storage space 410. If the first private storage space 410 is insufficient to fully store the first stream, the processor 104 may write the part of the first stream exceeding the first private storage space 410 into the shared storage space 430 from a first end (for example, a top end) of the shared storage space 430. Thereafter, if the second private storage space 420 is insufficient to fully store the second stream, the processor 104 may write the part of the second stream exceeding the second private storage space 420 into the shared storage space 430 from a second end (for example, a bottom end) of the shared storage space 430. In other words, the processor 104 may take the part of the shared storage space 430 that is not used by the first stream as the coding budget of the second stream. In this way, the related storage space corresponding to the first specific block group G0 may be flexibly used. Further description is made below.

As shown in FIG. 4, the shared storage space 430 may be divided into a plurality of first segments S0-S15, where a part of the first segments S0-S15 used for storing the first stream is referred to as a first part 430a, and a part of the first segments S0-S15 used for storing the second stream is referred to as a second part 430b. In an embodiment, the amount (i.e., 5) of the first segments S0-S4 in the first part 430a may be recorded as the segment usage amount (for example, "0101") of the aforementioned shared space information. Moreover, a dividing method of the shared storage space 430 may be determined according to the spatial division granularity information in the shared space information.

In an embodiment, the spatial division granularity information may be selected from a plurality of candidate granularities, and the processor 104 may determine the spatial division granularity information based on a granularity division mechanism. To be specific, the processor 104 may divide the shared storage space into a plurality of reference segments according to an $i^{th}$ candidate granularity in the plurality of candidate granularities, and calculate a specific byte number used by the first private storage space 410, the second private storage space 420 and the plurality of reference segments for cooperatively storing the first stream and the second stream, where i is a positive integer smaller than an amount of the plurality of candidate granularities. Then, the processor 104 may calculate the specific byte number corresponding to each of the candidate granularities, and take one of the plurality of candidate granularities corresponding to a lowest specific byte number as the aforementioned spatial division granularity information.

Taking FIG. 5 as an example, FIG. 5 is a schematic diagram of dividing the shared storage space into a plurality of first segments according to 4 candidate granularities LV0-LV3. Taking the candidate granularity LV0 as an example, the processor 104 may divide the shared storage space 430 into 2 first segments according to the candidate granularity LV0, and a size of each of the first segments is, for example, 64 bits. Taking the candidate granularity LV3 as an example, the processor 104 may divide the shared storage space 430 into 16 first segments according to the candidate granularity LV3, and a size of each of the first segments is, for example, 8 bits (i.e., the pattern shown in FIG. 4). Methods of dividing the shared storage space by the processor 104 based on the candidate granularities LV1 and LV2 may be deduced according to the above instruction, and details thereof are not repeated.

For example, it is assumed that the first stream requires 11 bits in the shared storage space 430. In this case, if the candidate granularity LV0 is adopted (which may be represented by one bit, for example, "0"), one reference segment (which may be represented by 2 bits, for example, "01") is required for storage. Therefore, if the first private storage space 410, the second private storage space 420 and the aforementioned reference segment are used to cooperatively store the first stream and the second stream, 14 (i.e., 11+1+2) bits are required, which actually occupy 8 bytes. Namely, the specific byte number corresponding to the candidate granularity LV0 is 8.

If the candidate granularity LV1 is adopted (which may be represented by 2 bits, for example, "01"), one reference segment (which may be represented by 2 bits, for example, "01") is required for storage. Therefore, if the first private storage space 410, the second private storage space 420 and the aforementioned reference segment are used to cooperatively store the first stream and the second stream, 15 (i.e., 11+2+2) bits are required, which actually occupy 4 bytes. Namely, the specific byte number corresponding to the candidate granularity LV1 is 4.

Similarly, if the candidate granularity LV2 is adopted, 16 bits are required, which actually occupy 2 bytes. Namely, the specific byte number corresponding to the candidate granularity LV2 is 2. If the candidate granularity LV3 is adopted, 17 bits are required, which actually occupy 3 bytes. Namely, the specific byte number corresponding to the candidate granularity LV3 is 3. Therefore, it is known that the candidate granularity LV2 has the lowest specific byte number in the candidate granularities LV0-LV3, so that the processor 104 may take the candidate granularity LV2 as the aforementioned spatial division granularity information.

Moreover, according to the above description, it is known that the spatial division granularity information (i.e., the candidate granularity LV3) adopted in FIG. 4 is also determined by the processor 104 based on the aforementioned granularity division mechanism. Namely, the processor 104 divides the shared storage space 430 into 16 first segments S0-S15 based on the candidate granularity LV3.

In an embodiment, before the step S220 is executed, the processor 104 may first execute the aforementioned mechanism to determine the shared space information (including the spatial division granularity information and the segment usage amount) associated with the first specific block group G0 to serve a determination basis of the step S220, but the disclosure is not limited thereto.

Then, in a step S240, when the first private storage space 410 is insufficient to store the first stream, the processor 104 uses the first private storage space 410 and the first part 430a of the first segments S0-S15 to cooperatively store the first stream. Namely, the processor 104 may use the first part 430a (which includes the first segments S0-S4) located at the first end (for example, the top end) of the shared storage space 430 to store the part of the first stream exceeding the first private storage space 410.

In an embodiment, after the first private storage space 410 is completely used for storing a part of the first stream, regarding the remained part of the first stream (i.e., the part exceeding the first private storage space 410), the processor 104 may write the remained part of the first stream into the shared storage space 430 from the top end of the shared storage space 430. Namely, the processor 104 may sequentially write the remained part of the first stream into the first segments S0-S4, but the disclosure is not limited thereto. In an embodiment, the processor 104 may further use the segment usage amount corresponding to the first specific block group G0 to record the amount of the first segments S0-S4, i.e., 5 ("0101") in the first part 430a.

Moreover, in a step S250, when the second private storage space 420 is insufficient to store the second stream, the processor 104 uses the second private storage space 420 and the second part 430b of the first segments S0-S15 to cooperatively store the second stream. Namely, the processor 104 may use the second part 430b (which includes the first segments S8-S15) located at the second end (for example, the bottom end) of the shared storage space 430 to store the part of the second stream exceeding the second private storage space 420.

In an embodiment, after the second private storage space 420 is completely used for storing a part of the second stream, regarding the remained part of the second stream (i.e., the part exceeding the second private storage space 420), the processor 104 may write the remained part of the second stream into the shared storage space 430 from the bottom end of the shared storage space 430. Namely, the processor 104 may sequentially write the remained part of the second stream into the first segments S15-S8, but the disclosure is not limited thereto.

According to another aspect, regarding the second block of the first specific block group G0, the available coding budget thereof depends on whether the processor 104 adopts the dynamic memory allocation mechanism to the first specific block group G0. If the dynamic memory allocation mechanism is adopted, the processor 104 may learn how many unused segments in the shared storage space 430 may be used as the coding budget of the second block based on the shared space information. Namely, the processor 104 may get to learn a dividing method of the shared storage space 430 according to the spatial division granularity information, and get to learn the amount of the first segments used for storing the remained part of the first stream based on the segment usage amount.

Taking FIG. 4 as an example, after the processor 104 completes storing the first stream, the processor 104 may take all of the unused first sections S5-S15 as the coding budget of the second block. Therefore, the method provided by the disclosure may allocate the corresponding coding budgets according to the content complexity of the first block and the second block belonging to the same specific block group, and support re-adjustment of the coding budgets, so as to improve flexibility of the encoder while ensuring the coding quality.

On the other hand, if the dynamic memory allocation mechanism is not adopted, the respective coding budgets of the first block and the second block are the original coding budget (for example, 192 bits).

Moreover, as described above, although the above embodiments are all described based on the first specific block group G0, regarding the other specific block groups (for example, the first specific block groups G1 and G2) of the first image frame 300, the processor 104 may also arrange related coding budgets to the specific block groups based on the mechanism introduced in the above embodiment. In other words, the operations performed by the processor 104 on each of the specific block groups are independent from each other. Namely, the shared space information obtained by the processor 104 for each of the first specific block groups G0-G2 may be different, so as to achieve a more flexible coding mechanism.

Moreover, according to FIG. 4, it is known that after the processor 104 completes storing the second stream, there is still an unused part 430c (which, for example, includes the first segments S5-S7) between the first part 430a and the second part 430b. In an embodiment, regarding a second image frame next to the first image frame 300, if the second image frame is in the partial update coding stage and includes a second specific block group corresponding to the first specific block group G0, the unused part 430c may serve as a coding budget of the second specific block group.

Therefore, after completing storing the first block and the second block, the processor 104 may write 0 to the first segments S5-S7 belonging to the unused part 430c to represent that the first segments S5-S7 are not used. Moreover, in order to facilitate processor 104 to identify a trailing end of the second part 430b in subsequent operations, the processor 104 may determine whether the last bytes of the second part 430b (for example, the last byte of the first segment S8 in FIG. 4) are all 0. If yes, the tailing end of the second part 430b is written by 1 (which is referred to as a trailing bit), and if not, no change is made.

To be specific, regarding the second image frame next to the first image frame 300, the processor 104 may obtain a third block and a fourth block belonging to the second specific block group from the second image frame. As described above, the second specific block group corresponds to the first specific block group G0, i.e., a position of the second specific block group in the second image frame is the same with the position of the first specific block group G0 in the first image frame. Moreover, a position of the third block in the second image frame is the same with the position of the first block in the first image frame, and a position of the fourth block in the second image frame is the same with the position of the second block in the first image frame.

Thereafter, the processor 104 may respectively compress the third block and the fourth block into the third stream and the fourth stream, and determine whether the first block and the second block adopt the dynamic memory allocation mechanism of the disclosure. In an embodiment, the processor 104 may obtain the corresponding flag bit of the first specific block group G0. If the flag bit is in the first state (for example, 1), it represents that the first block and the second block of the first specific block group G0 have adopt the dynamic memory allocation mechanism of the disclosure. On the other hand if the flag bit is in the second state (for example, 0), it represents that the first specific block group G0 does not adopt the dynamic memory allocation mechanism of the disclosure, but the disclosure is not limited thereto.

In response to determining to adopt the dynamic memory allocation mechanism to the first block and the second block, the processor 104 may allocate a third private storage space to the third block and allocate a fourth private storage space to the fourth block, and allocate another shared storage space shared by the third block and the fourth block, wherein the another shared storage space is divided into a plurality of second segments. Related details of the embodiment may refer to description of the previous embodiment, which are not repeated.

When the third private storage space is insufficient to store the third stream, the processor 104 may obtain the unused space 430c, and use the third private storage space, a third part of the aforementioned second segments and the unused space 430c to cooperatively store the third stream, where the third part of the second segments is located at a first end of the another shared storage space.

A difference between the embodiment and the aforementioned embodiment is that the processor 104 of the embodiment may use the unused space 430c corresponding to the first image frame 300 to store the third stream of the second image frame (which is in the partial update coding stage). In brief, in the partial update coding stage, the coding budget of the third block is changeable.

Therefore, the processor 104 may first obtain the unused space 430c based on related information of the first image frame 300. In an embodiment, the processor 104 may read the spatial division granularity information and the segment usage amount corresponding to the first specific block group G0. Thereafter, the processor 140 may deduce the first part 430a occupied by the first stream in the shared storage space 430 based on the spatial division granularity information and the segment usage amount.

Then, the processor 104 may start to read the shared storage space 430 from the trailing end of the first part 430a until a non-zero byte is read (i.e., the trailing end of the second part 430b), and take the first segments S5-S7 between the trailing end of the first part 430a and the non-zero byte as the unused space 430c.

Moreover, when the fourth private storage space is insufficient to store the fourth stream, the processor 104 may use the fourth private storage space, a fourth part of the aforementioned second segments to cooperatively store the second stream, where the fourth part of the second segments is located at a second end of the another shared storage space. Namely, in the partial update coding stage, the coding mechanism of the fourth block is the same with the coding mechanism in the full update coding stage, so that detail thereof may refer to related description of the aforementioned embodiment, which is not repeated.

In other embodiments, if the processor 104 learns that the dynamic memory allocation mechanism of the disclosure is not adopted for the first block and the second block of the first specific block group G0 based on the aforementioned flag bit, the processor 104 may arrange the related coding budgets for the third block and the fourth block of the second specific block group, and detail thereof is not repeated.

In summary, the image processing method and device of the disclosure may allocate the exclusive private storage spaces and the shared storage space for the first block and the second block after determining that the dynamic memory allocation mechanism of the disclosure is adopted to the first block and the second block belonging to the same specific block group. Moreover, after respectively compressing the first block and the second block into the first stream and the second stream, the image processing device of the disclosure may adaptively divide the shared storage space and perform corresponding dynamic allocation and dynamic updating, so that the corresponding coding budgets are allocated according to the content complexities of the first block and the second block. Moreover, the disclosure also supports the re-adjustment of the coding budget, thereby improving flexibility of an encoder while ensuring the coding quality.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An image processing method, comprising:
retrieving a first block and a second block belonging to a first specific block group from a first image frame, and respectively compressing the first block and the second block into a first stream and a second stream;
determining whether to adopt a dynamic memory allocation mechanism to the first block and the second block;
in response to determining to adopt the dynamic memory allocation mechanism to the first block and the second block, allocating a first private storage space to the first block, allocating a second private storage space to the second block, and allocating a shared storage space shared by the first block and the second block, wherein the shared storage space is divided into a plurality of first segments;
when the first private storage space is insufficient to store the first stream, using the first private storage space and a first part of the first segments to cooperatively store the first stream, wherein the first part of the first segments is located at a first end of the shared storage space; and when the second private storage space is insufficient to store the second stream, using the second private storage space and a second part of the first segments to cooperatively store the second stream, wherein the second part of the first segments is located at a second end of the shared storage space.

2. The image processing method as claimed in claim 1, wherein the first image frame is divided into a first sub-frame and a second sub-frame symmetrical to each other, the first block is located in the first sub-frame, the second block is located in the second sub-frame, and a position of the first block in the first sub-frame corresponds to a position of the second block in the second sub-frame.

3. The image processing method as claimed in claim 1, wherein the step of determining whether to adopt the dynamic memory allocation mechanism to the first block and the second block comprises:
determining whether a sum of a length of the first stream and a shared space information of the first specific block group is smaller than a coding budget of the first block by a predetermined length;
if yes, determining to adopt the dynamic memory allocation mechanism to the first block and the second block, and setting a flag bit of the first specific block group to a first state; and
if not, setting the flag bit to a second state to represent not to adopt the dynamic memory allocation mechanism to the first block and the second block.

4. The image processing method as claimed in claim 3, wherein the shared space information comprises a spatial division granularity information and a segment usage amount, wherein the spatial division granularity information defines an amount of the first segments, and the segment usage amount records the amount of the first segments in the first part.

5. The image processing method as claimed in claim 3, wherein in a full update coding state, the coding budget of the first block is a half of a coding budget of the first specific block group minus one, and the predetermined length is one byte.

6. The image processing method as claimed in claim 1, further comprising:
determining a spatial division granularity information corresponding to the first specific block group, and accordingly defining the amount of the first blocks; and
recording the amount of the first segments in the first part by a segment usage amount corresponding to the first specific block group.

7. The image processing method as claimed in claim 6, wherein the spatial division granularity information is selected from a plurality of candidate granularities, and the step of determining the spatial division granularity information corresponding to the first specific block group comprises:
dividing the shared storage space into a plurality of reference segments according to an $i^{th}$ candidate granularity in the candidate granularities, and calculating a specific byte number used by the first private storage space, the second private storage space and the reference segments for cooperatively storing the first stream and the second stream, wherein i is a positive integer smaller than an amount of the candidate granularities;
calculating the specific byte number corresponding to each of the candidate granularities; and
taking one of the candidate granularities corresponding to a lowest specific byte number as the spatial division granularity information.

8. The image processing method as claimed in claim 1, wherein in the shared storage space, there is an unused part between the first part and the second part, and the method further comprises:
writing 0 to the first segments belonging to the unused part; and
writing 1 to a trailing end of the second part in response to that a last byte of the second part is all 0.

9. The image processing method as claimed in claim 1, wherein in the shared storage space, there is an unused part between the first part and the second part, and the method further comprises:
retrieving a third block and a fourth block belonging to a second specific block group from a second image frame, wherein the second image frame is next to the first image frame and is in a partial update coding stage, and the first specific block group corresponds to the second specific block group;
respectively compressing the third block and the fourth block into a third stream and a fourth stream;
determining whether to adopt the dynamic memory allocation mechanism to the first block and the second block;
in response to determining to adopt the dynamic memory allocation mechanism to the first block and the second block, allocating a third private storage space to the third block and allocating a fourth private storage space to the fourth block, and allocating another shared storage space shared by the third block and the fourth block, wherein the another shared storage space is divided into a plurality of second segments; and
when the third private storage space is insufficient to store the third stream, obtaining the unused space, and using the third private storage space, a third part of the second segments and the unused space to cooperatively store the third stream, wherein the third part of the second segments is located at a first end of the another shared storage space.

10. The image processing method as claimed in claim 9, further comprising:
when the fourth private storage space is insufficient to store the fourth stream, using the fourth private storage space and a fourth part of the second segments to cooperatively store the second stream, wherein the fourth part of the second segments is located at a second end of the another shared storage space.

11. The image processing method as claimed in claim 9, wherein the step of determining whether the dynamic memory allocation mechanism is adopted to the first block and the second block comprises:
obtaining a flag bit corresponding to the first specific block group, wherein the flag bit indicates whether the dynamic memory allocation mechanism is adopted to the first block and the second block;
in response to a first state of the flag bit, determining that the dynamic memory allocation mechanism is adopted to the first block and the second block; and
in response to a second state of the flag bit, determining that the dynamic memory allocation mechanism is not adopted to the first block and the second block.

12. The image processing method as claimed in claim 9, wherein the step of obtaining the unused space comprises:
reading a spatial division granularity information and a segment usage amount corresponding to the first specific block group, wherein the spatial division granularity information defines an amount of the first segments, and the segment usage amount records the amount of the first segments;

deducing the first part of the first segments occupied by the first stream in the shared storage space based on the spatial division granularity information and the segment usage amount; and starting to read the shared storage space from a trailing end of the first part until reading a non-zero byte, and taking the first segments between the training end of the first part and the non-zero byte as the unused space.

13. An image processing device, comprising:
a storage circuit, storing a plurality of modules;
a processor, coupled to the storage circuit, and accessing the modules to execute following steps:
  retrieving a first block and a second block belonging to a first specific block group from a first image frame, and respectively compressing the first block and the second block into a first stream and a second stream;
  determining whether to adopt a dynamic memory allocation mechanism to the first block and the second block;
  in response to determining to adopt the dynamic memory allocation mechanism to the first block and the second block, allocating a first private storage space to the first block, allocating a second private storage space to the second block, and allocating a shared storage space shared by the first block and the second block, wherein the shared storage space is divided into a plurality of first segments;
  when the first private storage space is insufficient to store the first stream, using the first private storage space and a first part of the first segments to cooperatively store the first stream, wherein the first part of the first segments is located at a first end of the shared storage space; and
  when the second private storage space is insufficient to store the second stream, using the second private storage space and a second part of the first segments to cooperatively store the second stream, wherein the second part of the first segments is located at a second end of the shared storage space.

14. The image processing device as claimed in claim 13, wherein the first image frame is divided into a first sub-frame and a second sub-frame symmetrical to each other, the first block is located in the first sub-frame, the second block is located in the second sub-frame, and a position of the first block in the first sub-frame corresponds to a position of the second block in the second sub-frame.

15. The image processing device as claimed in claim 13, wherein the processor is configured to:
  determine whether a sum of a length of the first stream and a shared space information of the first specific block group is smaller than a coding budget of the first block by a predetermined length;
  if yes, determine to adopt the dynamic memory allocation mechanism to the first block and the second block, and set a flag bit of the first specific block group to a first state; and
  if not, set the flag bit to a second state to represent not to adopt the dynamic memory allocation mechanism to the first block and the second block.

16. The image processing device as claimed in claim 15, wherein the shared space information comprises a spatial division granularity information and a segment usage amount, wherein the spatial division granularity information defines an amount of the first segments, and the segment usage amount records the amount of the first segments in the first part.

17. The image processing device as claimed in claim 15, wherein in a full update coding state, the coding budget of the first block is a half of a coding budget of the first specific block group minus one, and the predetermined length is one byte.

18. The image processing device as claimed in claim 13, the processor is further configured to:
  determine a spatial division granularity information corresponding to the first specific block group, and accordingly define the amount of the first blocks; and
  record the amount of the first segments in the first part by a segment usage amount corresponding to the first specific block group.

19. The image processing device as claimed in claim 18, wherein the spatial division granularity information is selected from a plurality of candidate granularities, and the processor is configured to:
  divide the shared storage space into a plurality of reference segments according to an $i^{th}$ candidate granularity in the candidate granularities, and calculate a specific byte number used by the first private storage space, the second private storage space and the reference segments for cooperatively storing the first stream and the second stream, wherein i is a positive integer smaller than an amount of the candidate granularities;
  calculate the specific byte number corresponding to each of the candidate granularities; and
  take one of the candidate granularities corresponding to a lowest specific byte number as the spatial division granularity information.

20. The image processing device as claimed in claim 13, wherein in the shared storage space, there is an unused part between the first part and the second part, and the processor is further configured to:
  write 0 to the first segments belonging to the unused part; and
  write 1 to a trailing end of the second part in response to that a last byte of the second part is all 0.

21. The image processing device as claimed in claim 13, wherein in the shared storage space, there is an unused part between the first part and the second part, and the processor is further configured to:
  retrieve a third block and a fourth block belonging to a second specific block group from a second image frame, wherein the second image frame is next to the first image frame and is in a partial update coding stage, and the first specific block group corresponds to the second specific block group;
  respectively compress the third block and the fourth block into a third stream and a fourth stream;
  determine whether to adopt the dynamic memory allocation mechanism to the first block and the second block;
  in response to determining to adopt the dynamic memory allocation mechanism to the first block and the second block, allocate a third private storage space to the third block and allocate a fourth private storage space to the fourth block, and allocate another shared storage space shared by the third block and the fourth block, wherein the another shared storage space is divided into a plurality of second segments; and
  when the third private storage space is insufficient to store the third stream, obtain the unused space, and use the third private storage space, a third part of the second segments and the unused space to cooperatively store the third stream, wherein the third part of the second segments is located at a first end of the another shared storage space.

22. The image processing device as claimed in claim 21, wherein the processor is further configured to:
when the fourth private storage space is insufficient to store the fourth stream, use the fourth private storage space and a fourth part of the second segments to cooperatively store the second stream, wherein the fourth part of the second segments is located at a second end of the another shared storage space.

23. The image processing device as claimed in claim 21, wherein the processor is configured to:
obtain a flag bit corresponding to the first specific block group, wherein the flag bit indicates whether the dynamic memory allocation mechanism is adopted to the first block and the second block;
in response to a first state of the flag bit, determine that the dynamic memory allocation mechanism is adopted to the first block and the second block; and
in response to a second state of the flag bit, determine that the dynamic memory allocation mechanism is not adopted to the first block and the second block.

24. The image processing device as claimed in claim 21, wherein the processor is configured to:
read a spatial division granularity information and a segment usage amount corresponding to the first specific block group, wherein the spatial division granularity information defines an amount of the first segments, and the segment usage amount records the amount of the first segments;
deduce the first part of the first segments occupied by the first stream in the shared storage space based on the spatial division granularity information and the segment usage amount; and
start to read the shared storage space from a trailing end of the first part until reading a non-zero byte, and take the first segments between the training end of the first part and the non-zero byte as the unused space.

* * * * *